United States Patent
Graf et al.

(10) Patent No.: US 7,774,997 B2
(45) Date of Patent: Aug. 17, 2010

(54) SYSTEM COMPRISING A GLAZING ELEMENT AND A GAS SUPPLY DEVICE

(75) Inventors: Wolfgang Graf, Eschbach (DE); Rainer Rox, Beverungen (DE)

(73) Assignee: Interpane Entwicklungs-und Beratungsgesellschaft mbH & Co. KG, Lauenfoerde (DE)

( * ) Notice: Subject to any disclaimer, the term of this patent is extended or adjusted under 35 U.S.C. 154(b) by 1370 days.

(21) Appl. No.: 10/488,122

(22) PCT Filed: Aug. 19, 2002

(86) PCT No.: PCT/EP02/09254
§ 371 (c)(1), (2), (4) Date: Feb. 27, 2004

(87) PCT Pub. No.: WO03/021344
PCT Pub. Date: Mar. 13, 2003

(65) Prior Publication Data
US 2004/0206024 A1    Oct. 21, 2004

(30) Foreign Application Priority Data
Aug. 28, 2001   (DE) ................................ 101 41 897

(51) Int. Cl.
*E04H 14/00*   (2006.01)
*E06B 7/00*    (2006.01)
*E04C 2/54*    (2006.01)

(52) U.S. Cl. ............................ 52/171.3; 52/1; 52/786.1

(58) Field of Classification Search ................ 52/786.1, 52/171.3, 786.13, 1, 2.11, 2.16, 788.1, 204.52, 52/204.59, 204.591; 428/34, 69; 165/110, 165/111, 112, 113, 114; 454/196, 198, 199, 454/200, 205
See application file for complete search history.

(56) References Cited

U.S. PATENT DOCUMENTS 3,410,770 A  *  11/1968  Buechler .................... 205/628

(Continued)

FOREIGN PATENT DOCUMENTS

DE             44 40 572 C2      5/1996

(Continued)

*Primary Examiner*—Richare E Chilcot, Jr.
*Assistant Examiner*—Ryan D Kwiecinski
(74) *Attorney, Agent, or Firm*—Scully, Scott, Murphy & Presser, P.C.

(57) ABSTRACT

The invention relates to a system (1) comprising a glazing element (2) and a gas supply device (4), whereby the glazing element (2) has at least two substrates (18, 19), which enclose a space (3), and at least one gas of a defined composition located inside the space (3). A coating whose physical properties, in particular, optical and/or electrical properties, which can be altered according to the composition of the gas, is at least applied to one of the surfaces of a substrate (18, 19), said surfaces facing the space (3). The gas supply device (4) has at least one electrolysis device that has a working electrode (9), a counter electrode (10) and at least one electrolyte (17) for producing gas. The glazing element (2) and the gas supply device (4) are connected to one another whereby enabling the gas inside a closed circuit (6) to be guided between the glazing element (2) and the gas supply device (4). In addition, means for influencing the moisture content of the gas are placed inside the system.

31 Claims, 2 Drawing Sheets

U.S. PATENT DOCUMENTS

| | | | |
|---|---|---|---|
| 3,755,128 A * | 8/1973 | Herwig | 204/228.3 |
| 4,093,352 A * | 6/1978 | Pisar | 359/886 |
| 4,231,202 A * | 11/1980 | Dube | 52/171.3 |
| 5,096,549 A * | 3/1992 | Yamauchi et al. | 205/625 |
| 5,136,419 A * | 8/1992 | Shabrang | 359/265 |
| 5,139,595 A * | 8/1992 | Taylor | 156/104 |
| 5,318,108 A * | 6/1994 | Benson et al. | 165/96 |
| 5,575,835 A * | 11/1996 | Bailey et al. | 96/7 |
| 5,635,039 A * | 6/1997 | Cisar et al. | 204/252 |
| 5,864,994 A * | 2/1999 | Graf et al. | 52/171.3 |
| 6,084,702 A * | 7/2000 | Byker et al. | 359/288 |
| 6,216,688 B1 * | 4/2001 | Schwarz | 126/633 |
| 6,259,549 B1 * | 7/2001 | Leupolz et al. | 359/270 |
| 6,701,681 B2 * | 3/2004 | Kim | 52/171.3 |
| 7,133,181 B2 * | 11/2006 | Greer | 359/265 |

FOREIGN PATENT DOCUMENTS

| | | |
|---|---|---|
| DE | 196 31 420 A1 | 2/1998 |
| DE | 198 24 610 A1 | 12/1999 |
| WO | WO 96/15348 | 5/1996 |
| WO | WO 98/06000 | 2/1998 |

* cited by examiner

SYSTEM COMPRISING A GLAZING ELEMENT AND A GAS SUPPLY DEVICE

The invention relates to a system comprising a glazing element and a gas supply device.

A glazing element with variable transmission is known from DE 44 40 572 C2. This glazing element comprises at least two panes which enclose an intermediate space filled with gas. The gas contains inter alia hydrogen and oxygen, the content of hydrogen and oxygen in the gas atmosphere being able to be adjusted variably. On one face of the two panes, which is orientated towards the intermediate space, a reactive layer is applied and thereover a catalyst layer. The reactive layer and the catalyst layer co-operate in such a manner that the reactive layer changes its optical properties reversibly dependent upon the hydrogen and oxygen content in the gas atmosphere.

The above-mentioned layer structure comprising reactive layer and catalyst layer is designated also as gasochromic layer or coating.

The gas supply of a glazing element produced using a gasochromic layer, for example double glazing, requires hydrogen and oxygen in small quantities or low concentrations which are preferably below the combustibility limit. The reactive gases, for example hydrogen and oxygen, are diluted with inert gas, such as for example nitrogen, helium, neon, argon, krypton or xenon.

During the coloration or decoloration process of the gasochromic layer, water is produced again from hydrogen and oxygen which must be removed from the gas atmosphere enclosed by the two panes since condensation of water can otherwise occur. Condensation of water in a glazing element, for example double glazing, is undesirable since it leads to an impairment of the transparency and overall of the optical appearance and/or to an impairment of the gasochromic layer.

Provision of the gas atmosphere in the intermediate space of the glazing element with hydrogen and oxygen could in principle be effected by gas, provided from gas bottles, by oxygen from the ambient air, by hydrogen from metal hydride storers or by hydrogen and oxygen which are provided by electrolysis.

The provision with gas from gas bottles requires disadvantageously complex maintenance since the bottles must be changed at regular intervals. For example, diluted gas, e.g. 2% hydrogen in nitrogen, could be used since this mixture is not combustible. It is however disadvantageous that the consumption in this case is high and the gas bottle(s) must be changed very often.

If more highly concentrated or pure gases are used which are subsequently mixed with nitrogen, then the gas bottle on the one hand and the gas supply lines on the other hand must be designed correspondingly to be explosion-proof. This is complex and in addition cost-intensive.

When using oxygen from the ambient air, gaseous and/or particulate impurities necessarily pass into the system which lead in the long term to impairments, for example in the form of contamination of the system.

The provision with hydrogen could fundamentally be effected also using hydride storers. However, this leads fundamentally to the same difficulties as when using a gas bottle. Fundamentally, a metal hydride system for supplying and removing hydrogen would be very suitable. By heating the metal hydride system, hydrogen could be driven off and, by cooling, hydrogen could be incorporated again in the metal hydride system. The exclusive provision of hydrogen does not however suffice for the control operation of a glazing element using a gasochromic layer.

Furthermore, oxygen is also required for decoloration of a gasochromic layer.

When using conventional electrolysis cells, which operate predominantly in the alkaline range, the danger exists that the gasochromic layer is corroded by alkaline components. This danger is particularly great in the case of a $WO_3$ layer. Furthermore, the result can be condensation of water in the glazing element. This can occur in particular when heating of the glazing element and of the gas, for example during intensive sunshine in the coloured state, has resulted, and subsequent cooling of the glazing element, for example after sunset. As a result, the relative humidity in the glazing element can rise rapidly to 100%, whereupon condensation of water begins.

A further disadvantage of conventional electrolysis devices is that water is consumed and is not redirected to the electrolysis device. In this respect, it is necessary that water is supplied to the system from outside which implies an increased maintenance complexity.

In theory, it is conceivable that drying of the gas is effected when using conventional electrolysis cells. For example, drying agents could be used which must however be exchanged or heated from time to time in order to drive off the bonded water. Furthermore, cooling of the gas below the dew point could be effected. Compression of the gas via a semi-permeable membrane which is permeable only for water, is also conceivable.

The above-mentioned drying methods require however either a high outlay in appliances, spatial requirements, installations and/or maintenance. Furthermore, in the case of these theoretically conceivable solution approaches, the supply device for supplying surface areas of glazing elements must be designed correspondingly differently. This means that for glazing elements of different sizes, for example window surfaces, correspondingly designed supply devices must be provided.

It is the object of the invention to provide a system in which a glazing element having a gasochromic layer is to be provided, for example for glazing buildings or for window elements in vehicles or aeroplanes or ships, in which the composition of the gas atmosphere can be reliably controlled in a simple manner, and to provide a system in which the proportion of moisture in the gas atmosphere can be limited.

The object underlying the invention is achieved by a system having the features of claim 1.

Preferred developments are indicated in the sub-claims.

The system according to the invention comprising glazing element and gas supply device can be used in particular in the field of glazing buildings or for window elements for vehicles or aeroplanes or ships. In the field of glazing buildings, the glazing element can be configured as a window system which comprises two, three or more panes.

The substrate, for example panes made of glass or transparent polymer material, for example polymethacrylate or polycarbonate, of a glazing element have at least one face, which is orientated towards the intermediate space, a coating, the physical properties of which can be altered dependent upon the composition of the gas.

This coating can be constructed from a plurality of layers. For example, a reactive layer can be applied directly on the substrate and a catalyst layer can be applied on this reactive layer.

The reactive layer and the catalyst layer co-operate in that, dependent upon the composition of a gas, their physical properties, in particular the optical and/or electrical properties, are changed.

For example, a so-called electrochromic layer can be used as reactive layer. Furthermore, a metal hydride layer can also be used as reactive layer.

There is understood by electrochromic layer a layer which, with incorporation of positive ions, such as for example hydrogen ions, and/or electrons, can reversibly change its physical properties, in particular its optical properties, such as for example the colour of the layer.

An alteration of the physical properties, in particular of the optical properties, can also be effected by a reaction of oxides with hydrogen by forming water and oxygen defects in the layer. An electrochromic layer can comprise metal oxides, such as for example manganese oxide, cobalt oxide, tungsten oxide, molybdenum oxide, titanium oxide, chrome oxide, vanadium oxide, cerium oxide, iridium oxide, niobium oxide, nickel oxide or mixtures or compounds thereof.

Furthermore, also electrochromic polymers, such as for example polythiophenes, polyaniline, polypyrrole or mixtures thereof can be used.

The electrochromic layer or electrochromic layers can have a layer thickness in a range from approximately 100 nm to approximately 1000 nm, preferably approximately 200 nm to approximately 600 nm.

The structure comprising an electrochromic layer and catalyst layer is also designated as gasochromic layer or coating. Correspondingly, glazing elements produced by using one or more gasochromic layers are described as gasochromic glazing elements, for example as gasochromic windows.

The catalyst layer accelerates the reaction rate of the reaction taking place on or respectively in the electrochromic layer.

A thin layer of for example platinum, iridium, palladium, rhodium, osmium, rhenium, nickel and/or ruthenium can be applied as catalyst layer on the electrochromic layer. The catalyst layer can have a layer thickness of approximately 0.5 nm to approximately 10 nm, preferably from 1 nm to approximately 3 nm.

However, the catalyst layer need not be applied as a separate layer, but rather the catalyst or the catalysts can also be contained as an addition in the electrochromic layer.

One layer or a plurality of layers made of metal hydride(s) can also be used as reactive layer. These metal hydride layers can change for example their optical properties with incorporation or removal of hydrogen in the layer from reflective to absorbent. For this purpose, in particular metal hydrides of rare earths and transition metal oxides are suitable. For example, the metal hydrides can be selected from the group which comprises $La_{1-z}Mg_zH_x$, $Gd_{1-z}Mg_zH_x$, $Y_{1-z}Mg_zH_x$, $YH_b$, $LaH_b$, $SmH_b$, $NiMg_2H_x$, $CoMg_2H_x$ and mixtures thereof, z being able to adopt values in a range of 0 to less than 1,
x values in a range of 0 to 5 and
b values in a range of 0 to 3.

The metal hydride layers can have a layer thickness in a range of approximately 10 nm to approximately 500 nm, preferably of approximately 20 nm to 50 nm.

A catalyst layer can also be applied on the metal hydride layer(s) in order to accelerate the reaction rate of the reaction occurring on or in the metal hydride layer. A thin layer of for example, platinum, iridium, palladium, rhodium, osmium, rhenium, and/or ruthenium can be applied on the metal hydride layer as catalyst layer. The catalyst layer need not be applied as a separate layer but rather the catalyst or the catalysts can be contained also as an addition in the metal hydride layer.

If it is applied as a separate layer on the metal hydride layer, the catalyst layer can have an extremely advantageous effect at the same time also as a protective layer for the metal hydride layers which are partially sensitive to oxygen and/or water.

The layer thickness of the catalyst layer can be in a range of approximately 0.5 nm to approximately 50 nm, preferably 5 nm to approximately 30 nm as long as the catalyst layer is intended to act at the same time also as protective layer. If the catalyst layer is not intended to act also as protective layer, the layer thickness can be reduced further. According to a preferred embodiment, the catalyst layer in this case can have a layer thickness of for example approximately 1 nm to approximately 3 nm.

The reactive layer and the catalyst layer co-operate such that the reactive layer can reversibly change its physical properties, preferably its optical properties, for example the coloration and hence its transmission and/or reflection, dependent upon the composition of the gas or of the gas atmosphere.

For example also the electrical properties can hereby be changed. For example, the conductivity increases in the case of tungsten oxide by orders of magnitude if the composition of the gas, which is in contact with the electrochromic layer and with the catalyst layer, changes.

The electrical conductivity in the case of metal-insulator transitions of the metal hydrides changes correspondingly.

As gas or gas mixture which reacts with the reactive layer or layers in the glazing element and can be produced in the gas supply device, there is used an oxidising and a reducing gas or respectively an oxidising and a reducing gas mixture. For example, the halogens fluorine, chlorine, bromine, iodine or mixtures thereof can be used as the gas. According to a preferred development of the invention, hydrogen and oxygen are used as the gas. These gases or these gas mixtures can be diluted with further gases which preferably do not react with the reactive layers (inert gases).

By mixing the gases produced in the gas supply device with the inert gases located in the system, the reactive gas concentration in the overall system can be influenced. Concentrations below 5%, particularly preferred below 3%, can be set preferably.

The gas atmosphere, which is disposed in the intermediate space enclosed by at least two substrates, contains in an exceptionally preferred manner hydrogen and oxygen in small quantities and low concentrations which are preferably below the combustibility limit. In particular when using a $WO_3$ or $MoO_3$ layer or a $W_{1-y}M_{oy}O_3$ mixed oxide layer ($0 \leq y \leq 1$, preferably $0 < y < 0.4$, particularly preferred $0 < y < 0.25$) with a thin catalyst layer, for example made of platinum, rhodium and/or iridium, the result is a coloration or decoloration process of the coated substrate dependent upon the hydrogen or oxygen concentration.

In order to control the colouring or darkening and decolouring process, hydrogen or oxygen is provided for example when using a $WO_3$ layer. The concentration of hydrogen or oxygen is generally below 3% relative to the volume of the gas composition, and hence below the combustibility limit. Any inert gas or any inert gas mixture can be used as carrier gas for filling the intermediate space. For example, nitrogen and/or noble gases, such as e.g. helium, neon, argon, krypton, xenon etc. or mixtures thereof, can be used.

Only small quantities of hydrogen and oxygen are required in the case of the system according to the invention. Approximately 50 ml pure gas per square meter substrate surface area generally suffice per control process. In this respect, only small gas production rates are required. For example, with a control time of 1 min and 60 ml gas, these are 1 ml gas/second for 1 $m^2$ substrate surface area.

Correspondingly there are produced for 5 minutes 0.2 ml gas/second, for 10 minutes 0.1 ml gas/second and for 10 seconds 6 ml gas/second. In the case of smaller substrate surface areas, the required gas consumption is correspondingly smaller, i.e. for example at 0.1 $m^2$ and 60 seconds control time approximately 0.1 ml gas/second, with 0.01 $m^2$ correspondingly 0.01 ml gas/second and for 10 $m^2$ and 60 seconds control time 10 ml gas/second. Other values for control times, substrate surface areas and/or gas production rates can be calculated correspondingly.

In the case of these low gas production rates, the energy consumption of the gas supply device, i.e. the energy consumption for the electrolysis for producing gas is of lesser importance.

With the system according to the invention, 25,000 cycles with respectively 50 ml produced gas per 1 $m^2$, i.e. in total 1,250 l gas/$m^2$ can be readily provided. In this case, the operating time is for example 25,000×2 min, i.e. in total 35 days. Of course, even longer operating times can be sustained or respectively larger quantities of produced gas can be made available.

Consequently, the system according to the invention has exceptionally advantageously an outstanding long-term stability. The system according to the invention is therefore exceptionally suitable for use in the building field where the service lives are approximately 25 years.

It is possible furthermore to construct the system according to the invention to be compact and small. Consequently, the system according to the invention can be easily integrated into the facade of a building, of a vehicle, aeroplane or ship.

In the system according to the invention there are means disposed for influencing the moisture content of the gas. As a result, a restriction in the moisture content of the gas can be achieved and the condensation of moisture in the intermediate space formed between the substrates can be avoided.

Likewise, the moisture can also be restricted with respect to too low moisture content if this is desired.

These means for influencing the moisture content of the gas are disposed in an exceptionally preferred manner in the gas supply device. These means are disposed in a further preferred manner in the electrolyte of the electrolysis device.

According to a preferred embodiment, these means can be a supplement or a plurality of supplements to the electrolyte, for example salts, acids and/or caustic solutions. The moisture contained in the gas is transferred by these supplements in the electrolyte, which withdraw this moisture, from the gas into the electrolyte. Hence drying of the gas and recycling of water from the gas into the electrolysis device, namely the electrolyte, is effected. The scale of the drying of the gas is determined by the concentration and the type of supplements in the electrolyte.

In this manner, the moisture is withdrawn from the system to the required extent via the gas flow circulating preferably in the system. This means that no condensation of water results in the glazing element in the case of the system according to the invention. Furthermore, the moisture is transferred preferably into the electrolyte, i.e. a circulation system, which is stable per se, is provided with respect to the moisture.

In an exceptionally preferred manner, hydrochloric acid, sulphuric acid, phosphoric acid, NaCl, $K_3PO_4$, NaOH, KOH and mixtures thereof are added to the electrolyte.

The invention is illustrated further subsequently with reference to FIG. 1 to FIG. 3.

In FIGS. 1 to 3, embodiments are illustrated by way of example which do not represent a limitation of the protective scope.

Figure 1:
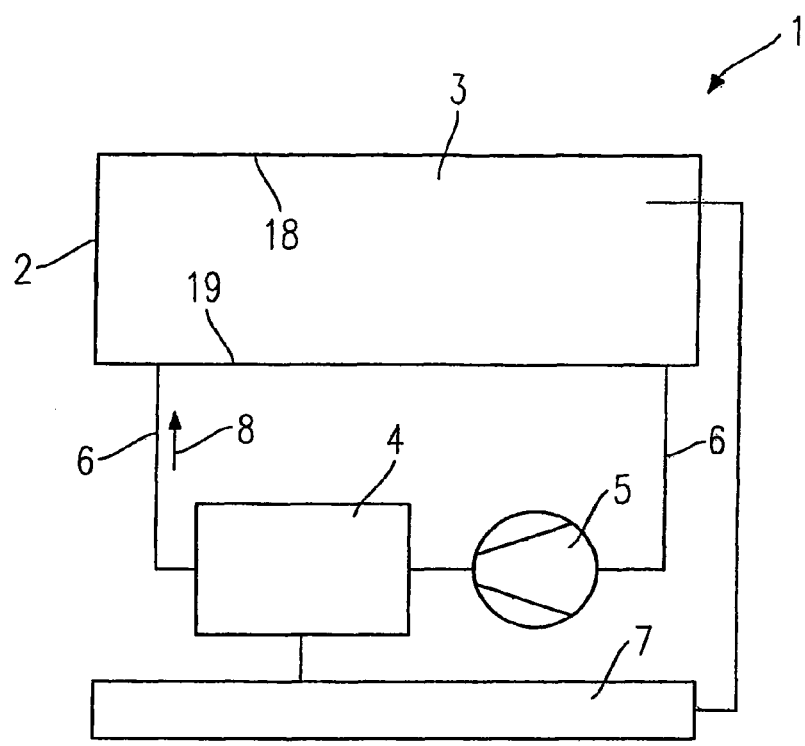
FIG. 1 shows a schematic representation of an embodiment of the system according to the invention, given by way of example.

FIG. 1 shows an embodiment of a system according to the invention 1, given by way of example. A double glazed window (glazing element 2) with an intermediate space 3 is disposed with a gas supply device 4 and a pump 5 in a closed circulation 6. The panes 18 and 19 of the double glazed window 2 are provided respectively on the face orientated towards the intermediate space 3 with a gasochromic coating (not shown). The gasochromic coating can however also be applied only on the face of one of the panes 18 or 19 which is orientated towards the intermediate space 3. A control unit 7 is connected to the window (glazing element 2), the gas supply device 4 and the pump 5. The electrical voltage supply of the gas supply device 4 and of the pump 5 is effected via the control unit 7. The arrow indicates the direction of the gas flow 8.

Instead of double glazing, multiple glazing, for example triple glazing, can also be used.

In the gas supply device 4, hydrogen and oxygen are produced from an aqueous electrolyte in an electrolysis device. Hydrogen or oxygen is supplied to the gas flow 8 which is pumped around in the closed circulation 6 using the pump 5. The gas flow is pumped around or circulated in the closed circulation system at least during a control process by the pump. Moisture or water, which has penetrated into the intermediate space 3 of the window (glazing element 2) possibly by means of leakages in the system or into the intermediate space 3 by means of the control process, is transferred by the gas flow 8 via the closed circulation 6 to the gas supply device 4. The supplements in the electrolyte of the electrolysis device in the gas supply device 4 have the effect that the entrained water or the entrained moisture in the gas flow 8 is taken up by the electrolyte.

In order to avoid condensation, it is of advantage if the temperature of the gas supply device 4 is lower, equal to, or not substantially above the temperature of the window (glazing element 2).

The gas supply device 4 or the electrolysis device is preferably in thermal contact with the window (glazing element 2) or with the outside temperature which for example a building facade has in order that the relative air humidity in the gas supply device 4 corresponds to that of the window 2. Otherwise, the possibility exists that the gas supply device 4 has a higher temperature than the window (glazing element 2). In this case the result can be that the relative air humidity in the gas supply device 4 is significantly below 100%, the relative air humidity in the window (glazing element 2) can on the other hand reach 100% due to the lower window temperature, which can lead to condensation of water in the window (glazing element 2).

In FIG. 1, the pump 5 is disposed between the window (glazing element 2) and the gas supply device 4. The pump 5 can of course also be disposed between the gas supply device 4 and the window (glazing element 2).

The gas supply device 4 and the pump 5 can be controlled via the control unit 7. The input value for the control unit 7 can be a measuring signal of a physical parameter of the window. The physical parameter measured on the window can for example be the electrical resistance of the gasochromic layer, the transmission or reflection of the window (glazing element 2), the temperature in the intermediate space 3 of the window (glazing element 2), the outside temperature, the inside temperature, the radiation strength in the intermediate space 3 or outwith the window (glazing element 2), the moisture content of the gas atmosphere in the window (glazing element 2), etc. and also combinations of these parameters. The parameters can be determined in front of (e.g. outside of a building, vehicle etc.), in and/or behind (e.g. inside of a building, vehicle etc.) the window (glazing element 2).

Conventional sensors can be used for the detection of the physical parameter or parameters on or in the glazing element 2. The initial values of the sensors are then supplied to the control unit 7 and are for example processed there using a microprocessor. For example, thermoelements, temperature sensors etc. can be used for detecting the temperature. For determining the coloration or decoloration, i.e. change in the transmission and/or reflection, of the gasochromic layer, optical sensors can be used. The electrical conductivity can be determined for example via a conventional resistance measurement.

In addition or alternatively, one or more sensor elements can be integrated in the gas circulation and/or the gas supply system for detecting the gas composition. These can detect for example the concentration of gas flowing past.

For the gas supply device 4, there can be chosen a current control with voltage limitation or a voltage control or a run-through of a temporal profile with continuous increase in the current or the voltage at the beginning of the control process with or without the measuring signals being taken into account. For actuation of the pump 5, a pre-running and/or post-running time can be defined, during which the gas 8 is pumped around or circulated before the beginning and/or after the end of the gas production in the gas supply device 4.

Further drying elements, which are suitable for influencing or buffering the gas moisture, can be disposed in the intermediate space 3 of the window (glazing element 2). These drying elements, for example chemical drying agents, can be disposed within the frame or at any positions, preferably in the edge region, of the intermediate space 3 of the window (glazing element 2). The use of additional drying agents has the effect that the gas must be guided or pumped less often for drying through the gas supply device 4 or through the electrolysis device. Preferably, there are used as drying agents those which again release the absorbed water or the absorbed moisture in operational conditions. Of course, these additional drying elements can also be disposed outwith the intermediate space 3 of the window (glazing element 2), for example in the closed circulation 6. An arrangement of the drying agent outwith the window (glazing element 2) enables, if necessary, a simplified exchange if the drying agent is disposed for example in the form of a cartridge in the external circulation 6.

As emerges from FIG. 1, the system according to the invention can be operated exceptionally advantageously without valves. This is of very great advantage in particular with respect to the long usage times, for example approximately 25 years in the building sector or approximately 10 years in the automobile field. Failure of the system due to defective valves cannot occur in this embodiment. The control process is initiated by starting the gas production (oxygen or hydrogen) in the electrolysis device in the gas supply device 4.

By reversing the polarity of the electrolysis device in the gas supply device 4, hydrogen or oxygen is produced at the electrode, which is connected to the circulation 6 and is designated here as working electrode, and is introduced into the circulation 6. The introduction of hydrogen or oxygen then leads to coloration or decoloration of the gasochromic window (glazing element 2). By reversing the polarity of the electrolysis device in the gas supply device 4 or the electrode connected to the circulation 6, oxygen is then produced for example instead of hydrogen and hence a reversal of the colouring process of the gasochromic window (glazing element 2) is initiated.

It is of course also possible to use valves in the system according to the invention. In this case, the gas produced respectively on the counterelectrode side of the electrolysis device can be jointly used or further used. In this case, the gas produced in the counterelectrode can be stored in a gas accumulator until the next control process.

The system according to the invention permits in an exceptionally advantageous manner modular adaptation of the gas supply device with respect to the requirements of gas quantity and gas production rate. In the gas supply device, a plurality of electrolysis devices can be connected to each other in series or also in parallel. Hence a flexible system is provided in which, dependent upon the external requirements, for example upon the number of gasochromic windows (glazing element 2) to be controlled, electrolysis devices can be connected correspondingly. The current supply of the gas supply devices 4 can likewise be effected by a series or parallel connection.

The system 1 according to the invention can furthermore comprise an inert gas accumulator, for example in the form of an exchangeable gas cartridge. This inert gas accumulator, which is not shown in FIG. 1, can be disposed at any suitable position in the circulation system. Of course, the concentration of the inert gas in the gas mixture can be suitably measured, for example by gas sensors, and the measuring value can be transmitted to the control unit 7. Via the control unit 7, the supply of further inert gas from the inert gas accumulator to the gas mixture in the gas circulation can then be controlled in the system 1 according to the invention.

Figure 2A:
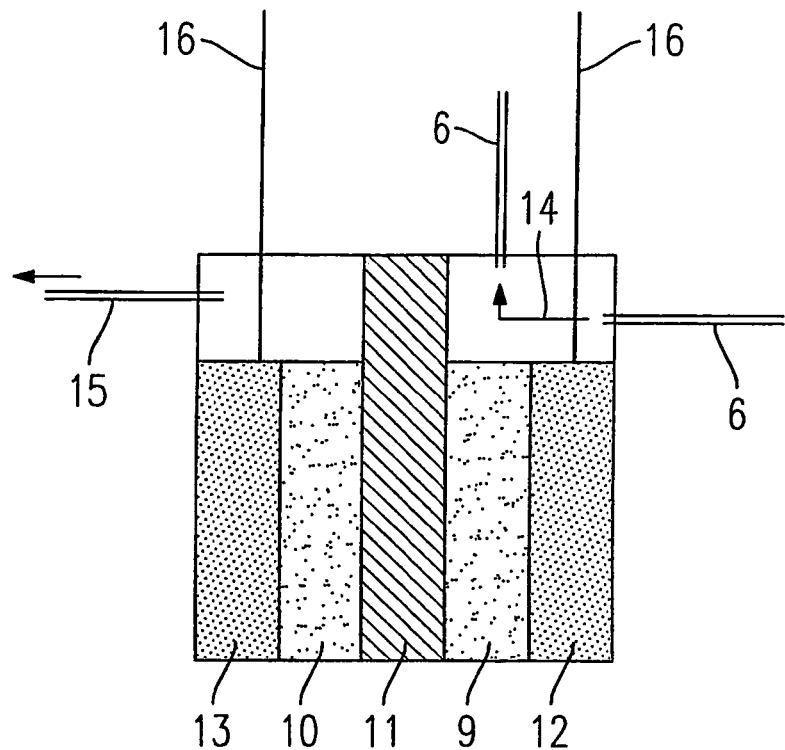
FIG. 2a shows an embodiment of an electrolysis device, given by way of example, which can be used in the system according to the invention.

FIG. 2a shows a construction of an electrolysis device 4, given by way of example, which can be used in the system 1 according to the invention.

The electrolysis device 4 comprises electrodes 9 and 10 which are separated from each other by a membrane 11. Current supply lines 12 or 13 are disposed on the electrodes 9 and 10. The current supply lines 12 and 13 are connected via the electrically conductive connection 16 to a voltage supply (not shown).

The electrode 9 is disposed in the circulation 6 which is not shown in this Figure. The gas produced at the electrode 9 (working electrode), for example hydrogen or oxygen, passes over into the gas flow 14 which can be circulated in the closed circulation 6 by means of the system according to the invention. The gas produced at the counterelectrode 10 can be dispersed via the gas outlet 15 to the environment or else be stored. The electrodes 9 or 10 are described here also as catalytic electrodes since, in preferred embodiments, the materials thereof are chosen such that the gas production or the redox reaction takes place preferably on their surface. The electrodes can contain for example palladium, platinum, iridium, osmium, rhodium, rhenium, ruthenium, nickel or mixtures of these metals or be produced therefrom. The electrode preferably has a porous property.

The current supply lines 12 and 13 are disposed for improved electrical current conduction at the electrodes 9 or 10. The current supply lines can contain for example ruthenium, rhodium, palladium, silver, rhenium, osmium, iridium, platinum, gold, nickel, titanium, carbon, stainless steel or mixtures thereof or be produced therefrom or be produced from a more reactive metal provided with a protective layer made of a more noble metal, for example ruthenium, rhodium, palladium, silver, rhenium, osmium, iridium, platinum, gold or electrically conductive metal oxides, such as for example doped tungsten oxide, tin oxide, zinc oxide, indium oxide or mixtures thereof.

The current supply lines 12 and 13 can have already adequate catalytic properties. The catalytic electrodes 9 and 10 can for example also have an adequate electrical conductivity. The current supply lines can then be replaced by the electrodes or the electrodes by the current supply lines, i.e. either the current supply lines or the electrodes can be omitted.

The membrane 11 is the separating element between the electrodes 9 and 10. The membrane 11 can for example be an ion-conducting, for example a proton-conducting, polymer film, such as for example Nafion® by the Du Pont company, Bad Homburg, Germany. The membrane 11 can however also be a porous solid body which is filled with electrolyte. The electrolysis device in the gas supply device 4 can for example be constructed such that the electrodes 9 and 10 are applied directly on the membrane 11. Furthermore, the current supply lines 12 and 13 can be applied directly on the electrodes 9 or 10.

In order to take away the produced hydrogen or oxygen gas, gas channels are provided in this case. For example, gas channels can be provided between the current supply line 12 and the electrode 9. These channels for removing the produced gas (gas channels) are not shown in FIG. 2a. In addition to the membrane 11, these gas channels can then be filled with electrolyte. The non-illustrated gas channels can however also be filled predominantly with gas, i.e. not with electrolyte. In the latter case, only the membrane 11 would then be filled with electrolyte.

Figure 2B:
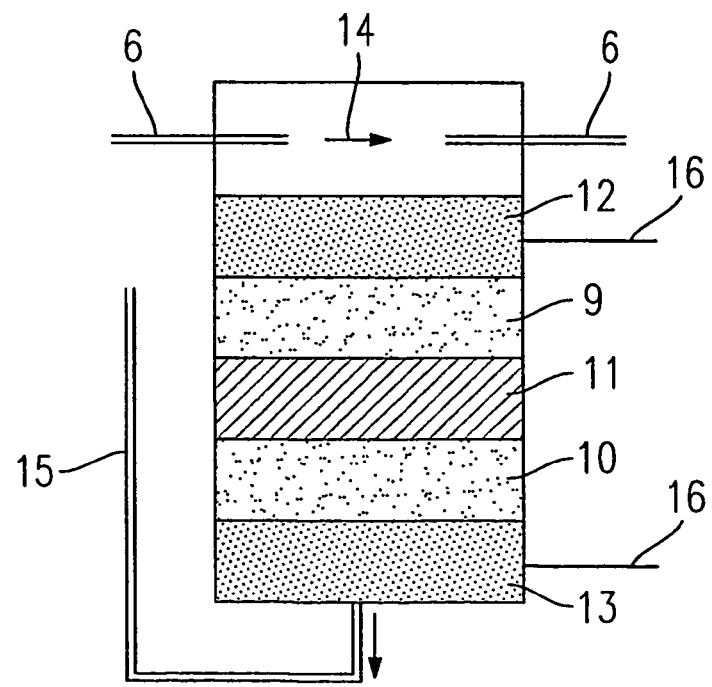
FIG. 2b shows a further embodiment of an electrolysis device, given by way of example, which can be used in the system according to the invention.

FIG. 2b shows an embodiment by way of example in which the electrolysis device is configured in a horizontal form. The reference numbers correspond to those of FIG. 2a. The hydrogen or oxygen produced in the electrode 9 is then supplied to the gas flow 14 which can be circulated in the closed circulation 6. The gas produced at the counterelectrode 10 can then be removed via the gas outlet 15, for example for discharge to the environment or for storage in a storage element. With the exception of the shortened membrane 11, this representation corresponds to the representation of FIG. 2a.

Figure 3:
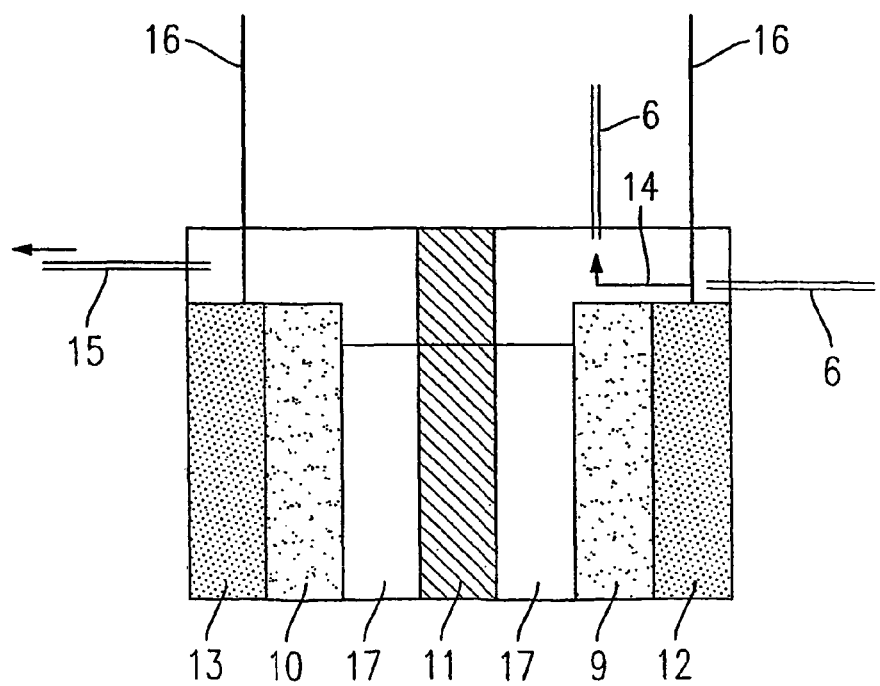
FIG. 3 shows a further embodiment of an electrolysis device, given by way of example, which can be used in the system according to the invention.

FIG. 3 illustrates a further embodiment of the electrolysis device in a vertical form. In this embodiment, the electrodes 9 and 10 respectively are applied on the current supply lines 12 or 13. In contrast to FIG. 2a and 2b, the electrodes 9 or 10 are not applied on the membrane 11. The intermediate space extending between the electrodes 9 and 10 over the membrane 11 is filled at least partially with an electrolyte 17. The membrane 11 serves for separating the hydrogen or oxygen gas produced at the electrodes 9 and 10. Otherwise, the representation corresponds to the representation of FIG. 2a.

In a further non-illustrated embodiment of the present invention, the electrolysis device has no gas outlet 15 on the counterelectrode side, as illustrated in FIGS. 2a, 2b and 3. Here, a targeted reverse reaction of hydrogen and oxygen on the counterelectrode side into water is effected. This reverse reaction can be accelerated by the (catalytic) counterelectrode alone or by additional catalysts.

Alternatively, the reverse reaction is also possible by addition of a salt or a solid material or a liquid into the electrolyte on the counterelectrode side, which salt, solid material or liquid then is subjected to a redox reaction by application of a voltage so that the redox reaction is effected instead of a gas production. As a result, the gas production of hydrogen or oxygen on the counterelectrode side is avoided on the one hand and the required voltage difference between the electrodes is reduced on the other hand since now only the voltage difference of the gas production reaction of hydrogen (or oxygen) on the working electrode side need be brought to the redox potential of the salt redox reaction on the counterelectrode side, for example ($Fe^{2+}/Fe^{3+}$) and not for gas production of oxygen or hydrogen on the counterelectrode side. This voltage difference with suitable redox pairs, such as for example $Fe^{2+}/Fe^{3+}$, is smaller than the voltage difference between hydrogen and oxygen. Examples of such salts are salts with iron, manganese, tin, tungsten, molybdenum, quicksilver, silver, iodine, copper, bromine, chlorine and bismuth ions or oxides thereof or complexes thereof or mixtures thereof.

According to a further preferred embodiment, there are contained in the electrode on the counterelectrode side, solid materials which include Fe, Mn, Sn, W, Mo, Hg, Ag, I, Cu, Br, Cl, Bi, Co, Ti, Cr, Ni, V ions or oxides thereof or complexes thereof or mixtures thereof.

Furthermore, it is preferred that gases are contained in the electrolyte on the counterelectrode side, such as hydrogen, oxygen, chlorine, bromine, iodine or mixtures thereof.

It is however also possible to use a gaseous material, for example hydrogen or oxygen which is formed during polarisation of the electrolysis device in the gas supply device 4 on the counterelectrode side, then it is reused during reverse polarisation and thermodynamically initiates the gas formation on the working electrode side and thus makes possible a lower voltage.

It is possible for example to form hydrogen gas on the counterelectrode side which passes in the form of protons through the membrane 11, the electrons flowing via the voltage supply back to the working electrode. At the working electrode, the protons are reduced again to hydrogen. This represents a gaseous analogue to a dissolved salt-redox pair on the counterelectrode side.

Solid materials are also possible as storage elements on the counterelectrode side. For example, solid tungsten oxide, preferably in porous form, can be applied on the counterelectrode side, the pores being penetrated by liquid electrolyte. When producing oxygen on the working electrode side, protons and electrons are incorporated in the tungsten oxide. When reversing the polarity, the protons leave the tungsten oxide, pass through the membrane and form hydrogen gas on the working electrode side. Further usable materials are transition metal oxides, such as e.g. the oxides of Mo, Ti, V, Cr, Mn, Co, Ni, Ce or mixtures (mixed oxides) thereof.

The invention claimed is:

1. System (1) operable in a valveless mode, comprising a glazing element (2) and a gas supply device (4), wherein
    the glazing element (2) comprises at least two substrates (18, 19), which enclose an intermediate space (3), and at least one gas disposed in the intermediate space (3) with a defined composition, a coating comprising at least one electrochromic layer being applied at least on one face of a substrate (18, 19) which is orientated towards the intermediate space (3), the physical properties of which coating comprising optical and/or electrical properties are alterable dependent upon the composition of the gas, the at least one electrochromic layer comprising oxides of transition metals which are selected from the group of materials consisting of iridium oxide, manganese oxide, cobalt oxide, niobium oxide, nickel oxide, or electrochromic polymers, the gas supply device (4) comprises at least one electrolysis device, a working electrode (9), a counterelectrode (10) and at least one electrolyte (17) in order to produce gas, the glazing element (2) and the gas supply device (4) are connected to each other such that the gas is guidable in a closed circulation (6) between the glazing element (2) and the gas supply device (4), at least one pump (5) being disposed in the system (1) for producing a directed gas flow (8, 14) in the closed circulation (6), means for influencing a moisture content of the gas are disposed in the system, means comprising an inert gas accumulator being connected to said gas supply device (4) for diluting the gas which is producible in the gas supply device (4) with an inert gas, which is selected from the group consisting of nitrogen, helium, neon, argon, krypton, or xenon, and wherein the concentration of the gas which is producible in the gas supply device (4), is adjustable by supplying said inert gas at below 5%, relative to the total volume of the gas mixture.

2. System (1) comprising a glazing element (2) and a gas supply device (4), wherein said system is operable in the absence of valves, the glazing element (2) comprising at least two substrates (18, 19), which enclose an intermediate space (3), and at least one gas disposed in the intermediate space (3) with a defined composition, a coating which comprises at least one layer containing switchable metal hydrides being applied at least on one face of a substrate (18, 19) which is orientated towards the intermediate space (3), the physical properties of which coating comprising optical and/or electrical properties are able to be altered dependent upon the composition of the gas, the at least one metal hydrides-containing layer comprises oxides of transition metals, which are selected from the group of materials consisting of iridium oxide, manganese oxide, cobalt oxide, niobium oxide, nickel oxide, or metal hydrides-containing polymers, the gas supply device (4) comprises at least one electrolysis device, a working electrode (9), a counterelectrode (10) and at least one electrolyte (17) in order to produce gas, the glazing element (2) and the gas supply device (4) are connected to each other such that the gas can be guided in a closed circulation (6) between the glazing element (2) and the gas supply device (4), at least one pump (5) being disposed in the system (1) for producing a directed gas flow (8, 14) in the closed circulation (6), and means for influencing a moisture content of the gas being disposed in the system.

3. System according to claim 2, wherein the coating comprises at least one electrochromic layer.

4. System according to claim 2, wherein said layer which contains switchable metal hydrides, comprises rare earths and/or transition metal oxides.

5. System according to claim 4, wherein the switchable metal hydrides are selected from the group which comprises $La_{1-z}Mg_zHx$, $YH_x$, $LaH_x$, $Gd_{1-z}Mg_zH_x$, $CoMg_zH_x$, $SmH_x$, or $Y_{1-z}Mg_zH_x$.

6. System according to claim 1 or 2, wherein the coating comprises catalysts as an addition and/or as a separate layer.

7. System according to claim 2, wherein the catalysts contain components from the group which comprises Pt, Ir, Pd, Rh, Os, Re, Ni, or Ru.

8. System according to claim 1 or 2, wherein the production of gas is effected at a gas production rate which is in a range of 10 ml/min to 500 ml/min.

9. System according to claim 1 or 2, wherein the electrolysis device produces hydrogen and oxygen from an aqueous said electrolyte (17), the hydrogen and/or oxygen being transferable into the glazing element (2).

10. System according to claim 1 or 2, wherein the electrolysis device has a reversible polarity.

11. System according claim 1 or 2, wherein moisture present or produced in the glazing element (2) is transferable into the electrolyte (17) of the electrolysis device.

12. System according to claim 1 or 2, wherein the means for influencing the moisture content of the gas are disposed in the gas supply device (4).

13. System according to claim 1 or 2, wherein the electrolyte (17) contains at least one supplement which withdraws moisture from the gas.

14. System according to claim 13, wherein the supplement is selected from the group of materials consisting of acids, caustic solutions, or salts.

15. System according to claim 14, wherein the supplement is selected from the group of materials consisting of hydrochloric acid, sulphuric acid, phosphoric acid, NaC1, $K_3PO_4$, NaOH, or KOH.

16. System according to claim 1 or 2, wherein the electrodes (9, 10) of the electrolysis device are applied directly on a membrane (11).

17. System according to claim 16, wherein the membrane (11) comprises an ion-conducting plastic material film or a porous solid material filled with electrolyte (17).

18. System according to claim 1 or 2, wherein the electrodes (9, 10) contain Ru, Rh, Pd, Re, Os, Ir, Pt, or Ni.

19. System according to claim 1 or 2, wherein current supply lines (12, 13) are provided in the electrolysis device, which are applied directly on the electrodes (9, 10).

20. System according to claim 19, wherein the current supply lines (12, 13) have channels for guiding gas.

21. System according to claim 20, wherein the current supply lines (12, 13) contain materials selected from the group consisting of Ti, C, Ni, Fe, Ru, Rh, Pd, Ag, Re, Os, Ir, Pt, Au, or more reactive metals which are provided with a protective layer selected from the group of methods consisting of Ru, Rh, Pd, Ag, Re, Os, Ir, Pt, Au, or electrically conductive metal oxides, selected from the group consisting of doped tungsten oxide, tin oxide, zinc oxide, or indium oxide.

22. System according to claim 1 or 2, wherein the electrolyte (17) on the counterelectrode side (10) contains additional redox pairs which undergo a redox reaction when a voltage is applied to the electrolysis device (4).

23. System according to claim 22, wherein salts, which include materials selected from the group consisting of hydrogen, oxygen, Fe, Mn, Sn, W Mo, Hg, Ag, I, Cu, Br, Cl, Bi ions, or oxides are dissolved in the electrolyte (17) on the counterelectrode side (10).

24. System according to claim 22, wherein solid materials are selected from the group consisting of Fe, Mn, Sn, W, Mo, Hg, Ag, I, Cu, Br, Cl, Bi, Co, Mn, Ti, Cr, Ni, V ions, or oxides are contained in the electrolyte (17) on the counterelectrode side (10).

25. System according to claim 22, wherein
gases, which comprise materials selected from the group consisting of hydrogen, oxygen, chlorine, bromine, or iodine are contained in the electrolyte (17) on the counterelectrode side (10).

26. System according to claim 1 or 2, wherein
the substrates (18, 19) are produced from glass or transparent polymer material.

27. System according to claim 1 or 2, wherein
the gas supply device (4) comprises a plurality of electrolysis devices which are connected to each other in series and/or in parallel.

28. System according to claim 1 or 2, wherein
the system (1) comprises means for detecting one or more physical parameter(s) of the glazing element and a control unit (7) for evaluating the detected parameter or parameters and setting a prescribed value of the physical parameter.

29. System according to claim 1 or 2, wherein
the system (1) has means for detecting at least one physical parameter of a sensor element integrated into the gas supply system or in the gas circulation for detecting the gas composition, and a control unit which takes this at least one parameter and selectively other parameters into account when controlling the electrolysis device.

30. System according to claim 1 or 2, wherein
the system has means for detecting physical parameters, such as temperature, radiation strength, moisture, in and/or on the system on the inside or outside of the glazing element (2), and a control unit (7) for evaluating the detected parameters and control of the system.

31. System according to claim 1 or 2, wherein
further elements for absorbing and/or storing moisture are disposed in the system.

* * * * *

UNITED STATES PATENT AND TRADEMARK OFFICE
CERTIFICATE OF CORRECTION

PATENT NO. : 7,774,997 B2 Page 1 of 1
APPLICATION NO. : 10/488122
DATED : August 17, 2010
INVENTOR(S) : Wolfgang Graf et al.

It is certified that error appears in the above-identified patent and that said Letters Patent is hereby corrected as shown below:

On the Title Page:
Item (73)   Assignee should read: Fraunhofer Gesellschaft Zur Forderung Der Angewandten Forschung E.V., Munchen (DE)

Signed and Sealed this

Ninth Day of November, 2010

David J. Kappos
*Director of the United States Patent and Trademark Office*